C. T. RICHMOND.
APPARATUS FOR MOLDING PLASTIC MATERIAL.
APPLICATION FILED MAY 25, 1916.

1,287,438.

Patented Dec. 10, 1918.
2 SHEETS—SHEET 1.

INVENTOR.
CHARLES T. RICHMOND
BY Ira J. Adams
ATTORNEY

C. T. RICHMOND.
APPARATUS FOR MOLDING PLASTIC MATERIAL.
APPLICATION FILED MAY 25, 1916.
1,287,438.
Patented Dec. 10, 1918.
2 SHEETS—SHEET 2.
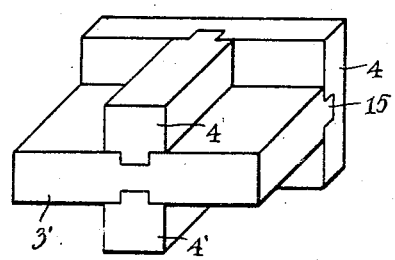
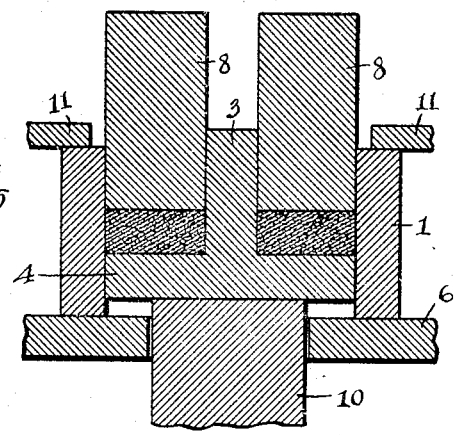
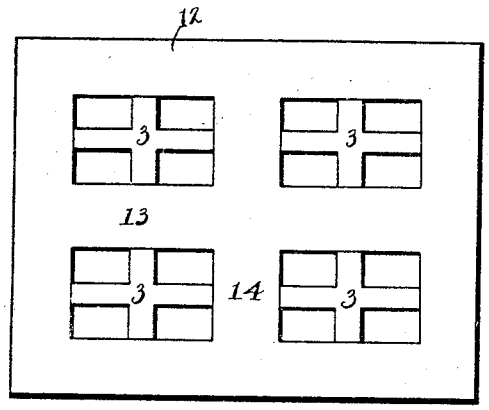
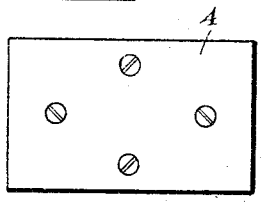
INVENTOR.
CHARLES T. RICHMOND
BY Ira J. Adams
ATTORNEY

UNITED STATES PATENT OFFICE.

CHARLES T. RICHMOND, OF CLEVELAND, OHIO, ASSIGNOR, BY MESNE ASSIGNMENTS, TO NATIONAL CARBON COMPANY, INC., A CORPORATION OF NEW YORK.

APPARATUS FOR MOLDING PLASTIC MATERIAL.

1,287,438.        Specification of Letters Patent.      Patented Dec. 10, 1918.

Application filed May 25, 1916. Serial No. 99,761.

*To all whom it may concern:*

Be it known that I, CHARLES T. RICHMOND, a citizen of the United States, residing at Cleveland, in the county of Cuyahoga and State of Ohio, have invented a certain new and useful Improvement in Apparatus for Molding Plastic Material, of which the following is a full, clear, and exact description.

This invention relates to an improvement in molding articles from mixes of pulverulent or of plastic material, and is especially applicable to molding metal-graphite and carbon articles such as brushes for dynamo electric machines, switch contacts, etc. With prior types of apparatus for this purpose it is impractical to mold accurately to size and density more than one article at a time and the process is therefore tedious and the output limited. It is the object of this invention to provide a method and apparatus for readily molding a plurality of articles simultaneously.

In the drawings:

Fig. 6 is a cross section with the parts in position to remove the molded articles.

Fig. 7 is a plan of a modified form of mold.

Fig. 8 is a perspective view of a built up spider to be used in the mold.

Fig. 9 is a bottom view of the spider shown in Fig. 8.

Figure 1:
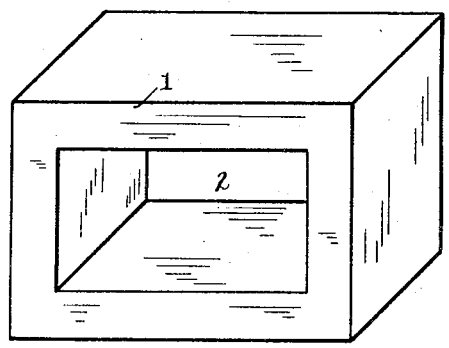
Figure 1 is a perspective view of the outer part of the mold.

The mold block 1, which may be of any shape but which is here shown as rectangular, has an opening 2 passing therethrough. The spider 3 consisting of two arms 3′ and 4′, perpendicularly arranged with respect to each other, has a base 4 secured thereto and is adapted to be slidingly fitted in the opening of the mold to form four compartments 5 in which the articles are to be molded. While the invention is not limited thereto, it will be described with reference to brushes for dynamo electric machines.

To mold the brushes the block with the inserted spider is placed on an appropriate support 6 and an equal quantity of mix, which may, by way of example, consist of graphite and powdered metal, is poured into each compartment 5 through four funnels 7 which are preferably joined together so they may be handled as a single unit. After filling the compartments the funnels are removed and plungers 8 are placed therein. The brushes are next compressed by moving the entire mold beneath a plunger 9 of a hydraulic ram which on descending against plungers 8, will compress the powder or mix to the desired extent. When sufficiently compressed the plunger of the hydraulic ram is raised and the mold is then moved into position over a piston 10 which may be elevated by any suitable means. The movement of this piston forces out the spider, the plungers and the molded articles where the latter can be readily picked out of the angular recesses. Suitable projecting lugs 11 may be provided to hold the mold while the piston is removing the spider from the mold frame. Also the spider may be removed by hand by means of a suitable hammer or mallet if desired.

My improved form of spider is open on two sides and at one end, so that when it is removed the molded brushes, or other articles, can be removed with ease. In order to have this advantage, four is the largest number of compartments that can be made in a spider if the articles are to be made of general rectangular shape. However, a spider with any number less than four can be made if desired.

Figure 2:
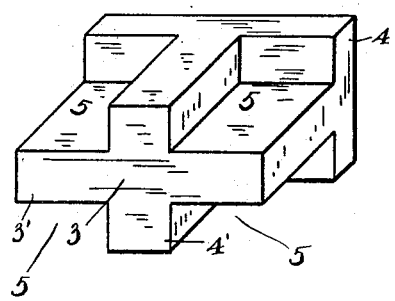
Fig. 2 is a perspective view of the central spider of the mold.
Figure 3:
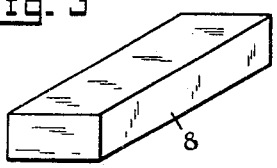
Fig. 3 is a perspective view of one of the compression plungers.
Figure 5:
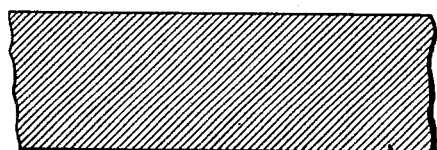
Fig. 5 is a similar cross section with the material under compression.
Figure 4:
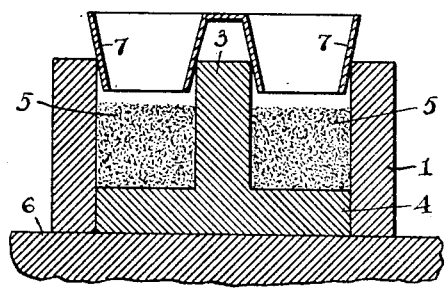
Fig. 4 is a cross section through two of the mold compartments with the "mix," or material to be molded, in position.
Figure 4:
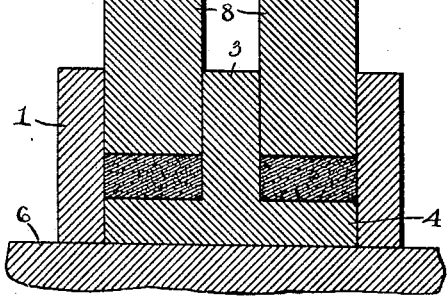

The arms and bottom plate are shown in Fig. 2 as being cut or formed from a single piece of metal. It is somewhat laborious to form the spider in this way and the bottom plate could be attached to the cross-arms by means of screws or tapered dowel pins. It is also advantageous to make the arms of separate pieces as shown in Figs. 8 and 9. In these figures the web 3′ has a tenon 15 fitting in a suitable mortise in the plate 4 and the arm 4′ at right angles thereto is divided into two parts each of which is mortised into the base 4 and the arm 3′, as clearly shown on the drawing. In order to permit the handling of this built up spider, it is preferable to have some detachable means for securing the arms in place, such as screws 16 shown in Fig. 9. These screws are passed through the spider plate 4 and are threaded into the respective arms to clamp them in position. It is advisable to countersink the heads of the screws so that they will be flush with the bottom of the plate.

The advantage of the built up spider does not reside alone in its cheapness of manufacture, but also in its flexibility of adjustment. With one mold frame and base plate, different sized articles can be molded by using arms of different thicknesses.

A multiple mold can be arranged to receive any number of my improved form of spiders, and in Fig. 7 by way of example, I have shown a mold frame 12 adapted to receive four spiders, each having a capacity of four brushes. This mold is divided into four compartments by means of webs 13 and 14 which may be integral with the outer frame or they may be dovetailed or mortised therein in much the same manner as is shown in Figs. 8 and 9. The method of operation of this form of mold will be apparent from what has already been described and it need not be given in detail.

Having described my invention, what I claim is:—

1. In apparatus for molding articles of the kind described, a frame having an opening therethrough, a base on which said frame is adapted to rest, a spider having a plurality of recesses each open on two sides, said spider being adapted to fit slidingly into the frame opening and rest on said base, a plunger adapted to fit into said recesses and means for applying pressure to the plungers.

2. In apparatus for molding articles of the kind described, a frame having a rectangular opening therethrough, a base on which said frame is adapted to rest, a spider having intersecting arms, a plate attached to one end of the spider forming with said arms four angular recesses, said spider and plate being adapted to slidingly fit into the frame opening and rest on the base, a plurality of plungers adapted to fit into the spaces and means for applying pressure to the plungers.

3. In apparatus for molding articles of the kind described, a frame having a rectangular opening therethrough, a base on which said frame is adapted to rest, a spider having two perpendicularly placed intersecting arms, a bottom plate attached to one end of the spider, adapted to rest on said base, said spider arms and bottom plate being adapted to slidingly fit into the frame opening to form four cavities for the material to be compressed, a plurality of plungers adapted to be fitted into the cavities, means for simultaneously applying pressure to the plungers to compress the materials, means for applying force to raise the plate and spider to force them from the frame, and means adapted to retain the frame while the plate and spider are being raised.

4. In apparatus for molding articles of the kind described, a frame having a plurality of rectangular openings therethrough, a base on which said frame is adapted to rest, a plurality of spiders each having two perpendicular intersecting arms, bottom plates attached to one end of each of the spiders, said spider arms and bottom plates being adapted to slidingly fit into the openings and rest on said base, a plurality of plungers adapted to fit into each of the spaces between the intersecting arms, means for simultaneously applying pressure to the plungers to compress the material in said spaces and means for applying force to raise the plates and spiders out of the frame.

In testimony whereof, I hereunto affix my signature.

C. T. RICHMOND.

Copies of this patent may be obtained for five cents each, by addressing the "Commissioner of Patents, Washington, D. C."